(No Model.)
J. C. F. ATSATT.
POULTRY DRINKING FOUNTAIN.
No. 596,732. Patented Jan. 4, 1898.
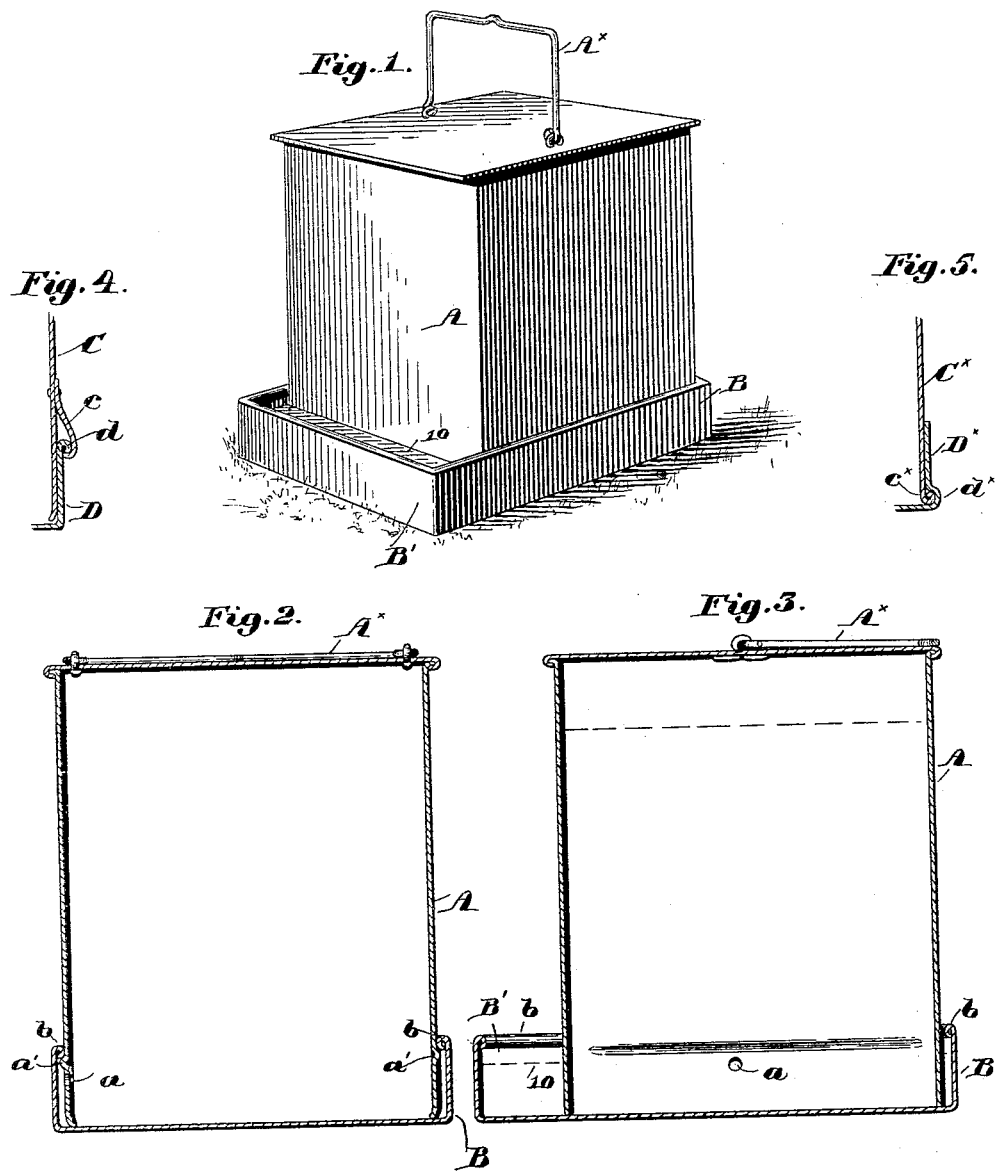
Witnesses:
Walter E. Lombard
Thomas J. Drummond
Inventor:
John C. F. Atsatt,
by Crosby Gregory,
Attys.

UNITED STATES PATENT OFFICE.

JOHN C. F. ATSATT, OF MATTAPOISETT, MASSACHUSETTS.

POULTRY DRINKING-FOUNTAIN.

SPECIFICATION forming part of Letters Patent No. 596,732, dated January 4, 1898.

Application filed March 6, 1897. Serial No. 626,180. (No model.)

*To all whom it may concern:*

Be it known that I, JOHN C. F. ATSATT, of Mattapoisett, county of Plymouth, State of Massachusetts, have invented an Improvement in Poultry Drinking-Fountains, of which the following description, in connection with the accompanying drawings, is a specification, like letters and figures on the drawings representing like parts.

This invention has for its object the production of a simple, cheap, and novel drinking-fountain for poultry, which can be easily cleaned and filled, will not readily become fouled, is not injured by freezing, and which prevents rapid evaporation of the water.

It consists, essentially, of a reservoir for the water and a pan or trough into which the reservoir fits tightly for the greater portion of its perimeter, the reservoir and trough or pan being preferably made rectangular in cross-section.

Figure 1 is a perspective view of a poultry drinking-fountain embodying my invention ready for use. Fig. 2 is a transverse vertical sectional view thereof enlarged. Fig. 3 is a longitudinal vertical section thereof, also enlarged; and Figs. 4 and 5 are partial sectional details of the retaining means for holding the reservoir and trough together.

The reservoir A is made, preferably, as a rectangular box-like structure closed at top and sides, open at the bottom, an opening $a$, Figs. 2 and 3, being made in one of the sides near the bottom. Two opposite sides are best shown in Fig. 2 as struck up to form horizontal ribs or projections $a'$ on the outer faces near the bottom, the reservoir being made of sheet metal, preferably galvanized iron. A shallow pan or trough B, also of sheet metal and rectangular, is made of a width equal to the width of the reservoir, but somewhat longer, so that when the reservoir is set into the pan a portion B' of the latter will project beyond the front wall of the reservoir, the back wall of the latter coming snugly against the back of the pan.

In Figs. 1 to 3 the top edges of the pan B are bent or rolled over to form an inturned bead $b$, which springs over the ribs $a'$ of the reservoir by the resiliency of the metal when the latter is pushed down into the pan, locking pan and reservoir firmly together.

To use the fountain, the reservoir is turned upside down, filled with water, and the pan B is pushed onto the open end—then upper end—of the reservoir. The two are then inverted, as shown in Figs. 1, 2, and 3, and the external atmosphere-pressure retains the water in the reservoir after the water has passed through the opening $a$ into the pan and up to the level 10 (see other lines, Fig. 3) of the top of the hole. The projecting part B' of the pan thus forms a comparatively narrow open trough at which the poultry can obtain water. It will be seen that only a small surface of water is exposed and cannot readily become dirty, as the poultry cannot get into it.

Should the water freeze, it will by expansion merely distend or bulge out the sides of the reservoir or force the pan off, so that the apparatus will not be fractured, as would be the case if the reservoir were cylindrical, and ice can be readily removed by immersing the device in hot water.

A handle $A^\times$ may be attached to the top of the reservoir, by which the fountain can be moved about or hung up.

In Fig. 4 I have shown the pan D as having the bead $d$ along its upper edge turned out to be engaged by spring-clips $c$ on the exterior of the reservoir-walls.

Another form of detachable connection is shown in Fig. 5, wherein the bottom edge of the reservoir $C^\times$ is provided with an outturned bead $c^\times$ to enter a suitable longitudinal depression $d^\times$ in the wall of the pan $D^\times$.

The apparatus is easily cleaned, as it can be instantly taken apart, and is quickly filled, as described, and the surface of water exposed to the air in the part B' of the pan is so small, comparatively, that evaporation is slow.

I am aware that it has been proposed to make a poultry water-can having a circular base containing a circular can proper snugly fitting therein and provided with outer walls to afford a drinking-trough for the fowls; but my invention resides, mainly, in providing means whereby freezing of the water or other liquid contained in the fountain will not ruin the latter, and to that end I have constructed the fountain with a removable base so secured that if the entire body of water should freeze the freezing thereof would simply force the base and reservoir apart without injury, and the freezing of the water in the pan portion would simply change the shape thereof without in any way permanently injuring it, the shape being rectangular—that is to say, not being circular—for the purpose of allowing this change of shape without injury to the pan.

Having fully described my invention, what I claim, and desire to secure by Letters Patent, is—

1. A poultry drinking-fountain, comprising a pan, a detachable reservoir to retain water, open at its bottom and adapted to fit snugly within said pan throughout the greater portion of its perimeter to leave a laterally-projecting open trough, and yielding means to detachably connect said pan and reservoir, said means yielding to an upward movement of the reservoir to permit the latter to be automatically moved from the pan by the freezing of said water, a portion of the pan projecting beyond the reservoir to form an open trough, substantially as described.

2. A poultry drinking-fountain, comprising a sheet-metal reservoir non-cylindrical in cross-section in order that it may yield to freezing-pressure of its contents and avoid bursting, and having an open bottom, a pan into which said reservoir fits for a portion of its perimeter, to leave a trough, and a yielding connection for said reservoir and pan, said pan also having a non-cylindrical form, whereby the expansion by freezing of the contents thereof may be freely exerted in all directions without danger of bursting, the form of the parts permitting lateral yield and the said connection permitting vertical yield, substantially as described.

In testimony whereof I have signed my name to this specification in the presence of two subscribing witnesses.

JOHN C. F. ATSATT.

Witnesses:
HEMAN G. HOLMES,
GEORGE A. BARSTOW.